United States Patent
Boesen et al.

(10) Patent No.: US 10,200,790 B2
(45) Date of Patent: Feb. 5, 2019

(54) EARPIECE WITH CELLULAR CONNECTIVITY

(71) Applicant: BRAGI GmbH, München (DE)

(72) Inventors: Peter Vincent Boesen, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/406,094

(22) Filed: Jan. 13, 2017

(65) Prior Publication Data

US 2017/0208393 A1 Jul. 20, 2017

Related U.S. Application Data

(60) Provisional application No. 62/279,092, filed on Jan. 15, 2016.

(51) Int. Cl.
*H04R 5/033* (2006.01)
*H04R 1/10* (2006.01)
(Continued)

(52) U.S. Cl.
CPC .............. *H04R 5/033* (2013.01); *H04M 1/05* (2013.01); *H04R 1/1016* (2013.01);
(Continued)

(58) Field of Classification Search
CPC .... H04R 5/033; H04R 1/1041; H04R 1/1058; H04R 1/1016; H04R 1/1025; H04M 1/05;
(Continued)

(56) References Cited

U.S. PATENT DOCUMENTS

| 3,934,100 A | 1/1976 | Harada |
|---|---|---|
| 4,150,262 A | 4/1979 | Ono |

(Continued)

FOREIGN PATENT DOCUMENTS

| EP | 1017252 A2 | 7/2000 |
|---|---|---|
| EP | 2903186 A1 | 8/2015 |

(Continued)

OTHER PUBLICATIONS

Announcing the $3,333,333 Stretch Goal (Feb. 24, 2014).

(Continued)

*Primary Examiner* — Vivian Chin
*Assistant Examiner* — Ubachukwu Odunukwe
(74) *Attorney, Agent, or Firm* — Goodhue, Coleman & Owens, P.C.

(57) ABSTRACT

An earpiece includes an earpiece housing, a processor disposed within the ear piece housing, a speaker operatively connected to the processor, at least one microphone operatively connected to the processor, and a cellular transceiver disposed within the earpiece housing and operatively connected to the processor. The cellular transceiver may be a low energy long term evolution (LTE) cellular transceiver. The ear piece may include an inertial sensor disposed within the earpiece housing and operatively connected to the processor. The earpiece may further include a short range transceiver disposed within the earpiece housing. The short range transceiver may be a Bluetooth transceiver. The earpiece may also include a slot within the earpiece housing for receiving an identity module.

16 Claims, 4 Drawing Sheets

(51) Int. Cl.
  *H04M 1/05*    (2006.01)
  *H04W 84/04*   (2009.01)
  *H04W 4/70*    (2018.01)
  *H04W 52/02*   (2009.01)
  *H04M 1/60*    (2006.01)
  *H04M 1/725*   (2006.01)
  *H04W 4/80*    (2018.01)

(52) U.S. Cl.
  CPC ......... *H04R 1/1025* (2013.01); *H04R 1/1041* (2013.01); *H04R 1/1058* (2013.01); *H04R 1/1091* (2013.01); *H04M 1/6033* (2013.01); *H04M 1/6066* (2013.01); *H04M 1/7253* (2013.01); *H04M 2250/02* (2013.01); *H04R 2420/07* (2013.01); *H04R 2420/09* (2013.01); *H04R 2499/11* (2013.01); *H04W 4/70* (2018.02); *H04W 4/80* (2018.02); *H04W 52/0206* (2013.01); *H04W 84/042* (2013.01)

(58) Field of Classification Search
  CPC .. H04M 1/6033; H04W 52/0206; H04W 4/70
  USPC .............. 381/74, 311; 455/41.2, 575.2, 11.1
  See application file for complete search history.

(56) References Cited

U.S. PATENT DOCUMENTS

| | | | |
|---|---|---|---|
| 4,334,315 A | 6/1982 | Ono et al. | |
| 4,375,016 A | 2/1983 | Harada | |
| 4,588,867 A | 5/1986 | Konomi | |
| 4,654,883 A | 3/1987 | Iwata | |
| 4,682,180 A | 7/1987 | Gans | |
| 4,791,673 A | 12/1988 | Schreiber | |
| 4,865,044 A | 9/1989 | Wallace et al. | |
| 5,191,602 A | 3/1993 | Regen et al. | |
| 5,201,007 A | 4/1993 | Ward et al. | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,363,444 A | 11/1994 | Norris | |
| 5,497,339 A | 3/1996 | Bernard | |
| 5,606,621 A | 2/1997 | Reiter et al. | |
| 5,613,222 A | 3/1997 | Guenther | |
| 5,692,059 A | 11/1997 | Kruger | |
| 5,721,783 A | 2/1998 | Anderson | |
| 5,749,072 A | 5/1998 | Mazurkiewicz et al. | |
| 5,771,438 A | 6/1998 | Palermo et al. | |
| 5,802,167 A | 9/1998 | Hong | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,208,372 B1 | 3/2001 | Barraclough | |
| 6,275,789 B1 | 8/2001 | Moser et al. | |
| 6,339,754 B1 | 1/2002 | Flanagan et al. | |
| 6,408,081 B1 | 6/2002 | Boesen | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,654,721 B2 | 11/2003 | Handelman | |
| 6,664,713 B2 | 12/2003 | Boesen | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| 7,463,902 B2 | 12/2008 | Boesen | |
| 7,508,411 B2 | 3/2009 | Boesen | |
| 7,983,628 B2 | 7/2011 | Boesen | |
| 8,140,357 B1 | 3/2012 | Boesen | |
| 2001/0005197 A1 | 6/2001 | Mishra et al. | |
| 2001/0027121 A1 | 10/2001 | Boesen | |
| 2001/0056350 A1 | 12/2001 | Calderone et al. | |
| 2002/0002413 A1 | 1/2002 | Tokue | |
| 2002/0007510 A1 | 1/2002 | Mann | |
| 2002/0010590 A1 | 1/2002 | Lee | |
| 2002/0030637 A1 | 3/2002 | Mann | |
| 2002/0046035 A1 | 4/2002 | Kitahara et al. | |
| 2002/0057810 A1 | 5/2002 | Boesen | |
| 2002/0076073 A1 | 6/2002 | Taenzer et al. | |
| 2002/0118852 A1 | 8/2002 | Boesen | |
| 2003/0065504 A1 | 4/2003 | Kraemer et al. | |
| 2003/0100331 A1 | 5/2003 | Dress et al. | |
| 2003/0104806 A1 | 6/2003 | Ruef et al. | |
| 2003/0115068 A1 | 6/2003 | Boesen | |
| 2003/0125096 A1 | 7/2003 | Boesen | |
| 2003/0218064 A1 | 11/2003 | Conner et al. | |
| 2004/0070564 A1 | 4/2004 | Dawson et al. | |
| 2004/0160511 A1 | 8/2004 | Boesen | |
| 2005/0043056 A1 | 2/2005 | Boesen | |
| 2005/0125320 A1 | 6/2005 | Boesen | |
| 2005/0148883 A1 | 7/2005 | Boesen | |
| 2005/0165663 A1 | 7/2005 | Razumov | |
| 2005/0196009 A1 | 9/2005 | Boesen | |
| 2005/0251455 A1 | 11/2005 | Boesen | |
| 2005/0266876 A1 | 12/2005 | Boesen | |
| 2006/0029246 A1 | 2/2006 | Boesen | |
| 2006/0074671 A1 | 4/2006 | Farmaner et al. | |
| 2006/0074808 A1 | 4/2006 | Boesen | |
| 2006/0166716 A1* | 7/2006 | Seshadri ............. H04M 1/6033 455/575.2 |
| 2008/0254780 A1 | 10/2008 | Kuhl et al. | |
| 2009/0017881 A1 | 1/2009 | Madrigal | |
| 2010/0320961 A1 | 12/2010 | Castillo et al. | |
| 2011/0286615 A1 | 11/2011 | Olodort et al. | |
| 2012/0057740 A1* | 3/2012 | Rosal ..................... H04R 25/65 381/380 |
| 2013/0316642 A1* | 11/2013 | Newham ........... H04W 52/0206 455/11.1 |
| 2013/0346168 A1* | 12/2013 | Zhou ...................... G06F 1/163 705/14.4 |
| 2014/0106677 A1* | 4/2014 | Altman ................ H04B 1/3827 455/41.2 |
| 2014/0235169 A1* | 8/2014 | Parkinson ............ H04W 4/008 455/41.2 |
| 2014/0270227 A1 | 9/2014 | Swanson | |
| 2015/0036835 A1* | 2/2015 | Chen ................... H04R 1/1041 381/74 |
| 2016/0360350 A1* | 12/2016 | Watson .................... H04W 4/70 |
| 2017/0064433 A1* | 3/2017 | Hirsch ................. H04R 1/1041 |
| 2017/0078780 A1* | 3/2017 | Qian ...................... H04R 1/105 |
| 2017/0188132 A1* | 6/2017 | Hirsch ................. H04R 1/1041 |

FOREIGN PATENT DOCUMENTS

| | | |
|---|---|---|
| GB | 2074817 | 4/1981 |
| JP | 06292195 | 10/1998 |

(56) References Cited

FOREIGN PATENT DOCUMENTS

| WO | 2014043179 A2 | 3/2014 |
|---|---|---|
| WO | 2015110577 A1 | 7/2015 |
| WO | 2015110587 A1 | 7/2015 |

OTHER PUBLICATIONS

BRAGI is on Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready to Rumble, A Lot to Be Done Over Christmas (Dec. 22, 2014).
BRAGI Update—Memories From April—Update on Progress (Sep. 16, 2014).
BRAGI Update—Memories from May—Update on Progress—Sweet (Oct. 13, 2014).
BRAGI Update—Memories From One Month Before Kickstarter—Update on Progress (Jul. 10, 2014).
BRAGI Update—Memories From the First Month of Kickstarter—Update on Progress (Aug. 1, 2014).
BRAGI Update—Memories From the Second Month of Kickstarter—Update on Progress (Aug. 22, 2014).
BRAGI Update—New People @Bragi—Prototypes (Jun. 26, 2014).
BRAGI Update—Office Tour, Tour to China, Tour to CES (Dec. 11, 2014).
BRAGI Update—Status on Wireless, Bits and Pieces, Testing-Oh Yeah, Timeline(Apr. 24, 2015).
BRAGI Update—The App Preview, the Charger, the SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back to China, Backer Day, on Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2014).
BRAGI Update—On Track, Design Verification, How It Works and What's Next(Jul. 15, 2015).
BRAGI Update—On Track, On Track and Gems Overview.
BRAGI Update—Status on Wireless, Supply, Timeline and Open House@BRAGI(Apr. 1, 2015).
BRAGI Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the BRAGI News (Feb. 21, 2014).
The Dash—A Word From Our Software, Mechanical and Acoustics Team + An Update (Mar. 11, 2014).
Update From BRAGI—$3,000,000—Yipee (Mar. 22, 2014).

* cited by examiner

EARPIECE WITH CELLULAR CONNECTIVITY

PRIORITY STATEMENT

This application claims priority to U.S. Provisional Patent Application 62/279,092, filed on Jan. 15, 2016, and entitled Earpiece with cellular connectivity, hereby incorporated by reference in its entirety.

FIELD OF THE INVENTION

The present invention relates to earpieces. More particularly, but not exclusively, the present invention relates to ear pieces which include cellular transceivers.

BACKGROUND

Cellular phones are widely used. However, what is needed is a wearable device such as an earpiece which provides cellular connectivity.

SUMMARY

Therefore, it is a primary object, feature, or advantage of the present invention to improve over the state of the art.

It is a further object, feature, or advantage of the present invention to provide an earpiece that communicates over a cellular communications channel.

It is a still further object, feature, or advantage of the present invention to eliminate the need for a cell phone.

A further object, feature, or advantage of the present invention is to improve the quality of calls made over a cellular network.

Another object, feature, or advantage of the present invention is to provide stereophonic communications over a cellular network.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect, an earpiece includes an earpiece housing, a processor disposed within the ear piece housing, a speaker operatively connected to the processor, at least one microphone operatively connected to the processor, and a cellular transceiver disposed within the earpiece housing and operatively connected to the processor. The cellular transceiver may be a low-energy long term evolution (LTE) cellular transceiver. The ear piece may include an inertial sensor disposed within the earpiece housing and operatively connected to the processor. The earpiece may further include a short range transceiver disposed within the earpiece housing. The short range transceiver may be a Bluetooth transceiver. The earpiece may also include a slot within the earpiece housing for receiving an identity module.

According to another aspect, a system includes a set of earpieces comprising a left ear piece and a right ear piece, each of the earpieces comprising an ear piece housing, a processor disposed within the ear piece housing, a speaker operatively connected to the processor, at least one microphone operatively connected to the processor, a cellular transceiver disposed within the ear piece housing and operatively connected to the processor, and a short range transceiver for operatively communicating with the other of the set of earpieces. The cellular transceiver may be a low energy long term evolution (LTE) cellular transceiver. Each of the earpieces may further include an inertial sensor disposed within the earpiece housing and operatively connected to the processor. There may be a slot within each of the earpiece housings to receive an identity module. The left ear piece and the right ear piece may be configured to determine to use either the cellular transceiver of the left ear piece or the cellular transceiver of the right ear piece based on available battery life in the left earpiece and available battery life in the right earpiece. The left ear piece and the right ear piece may be configured to provide for sending stereo communications by sensing audio at the left ear piece and sending audio at the right ear piece and communicating the audio at the left ear piece and the audio at the right ear piece over a cellular communications channel using either the cellular transceiver of the left ear piece or the cellular transceiver of the right ear piece. The left ear piece and the right ear piece may be configured to provide for reproducing stereo communications by receiving over the communications channel a stereo communication comprising a left channel and a right channel and transducing audio associated with the left channel at the left ear piece and transducing audio associated with the right channel at the right ear piece.

According to another aspect, a system includes a set of earpieces comprising a tell ear piece and a right ear piece, each of the earpieces comprising an ear piece housing, a processor disposed within the ear piece housing, a speaker operatively connected to the processor, at least one microphone operatively connected to the processor, and a short range transceiver, a charging case comprising a case housing, a short range transceiver disposed therein and a cellular transceiver disposed therein. Each of the set of earpieces may be configured to communicate with the short range transceiver of the charging case using the short range transceiver of the earpiece.

DETAILED DESCRIPTION

An earpiece with a cellular transceiver or a set of ear pieces each with a cellular transceiver is disclosed. In addition to functionality associated with cellular communications, due to the presence of one or more microphones in each ear piece and one or more speakers or transducers in each ear piece, stereophonic communications may be provided. In addition, where each earpiece has its own cellular transceiver, battery management functionality may allow for selecting which cellular transceiver to use based on remaining battery life. Where the earpieces include accelerometers head gestures may be used to perform common functions associated with making and receiving phone calls. In addition, the earpieces may store contact information including contact names and phone numbers. The earpieces may also provide for voice control and recording which may be used for making or answering phone calls, sending text messages, receiving text messages, sending email, or receiving email, using social media, and other functionality.

Figure 1:
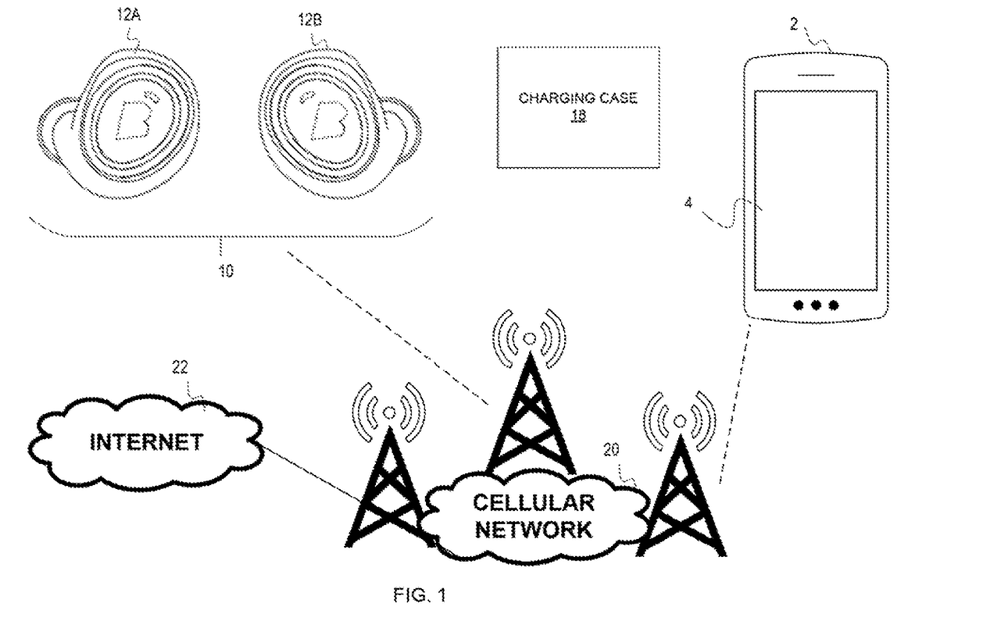
FIG. 1 is a diagram of one example of earpieces.

FIG. 1 illustrates one example of system which includes a set of earpieces 10 which include a left earpiece 12A and a right earpiece 12B. Each of the earpieces 12A, 12B within the set of earpieces may include a cellular transceiver which allows for operative communication over a cellular network 20 and over the internet 22. Similarly, a mobile phone 2 with a display 4 or other device with a display may be in operative communication with one or more earpieces over the cellular network 20 or otherwise.

The cellular transceiver may be a low energy long term evolution (LTE) cellular transceiver. Preferably, the cellular transceiver uses low energy in order to preserve battery life. However, the cellular transceiver may also be of other types such as a GSM/GPRS transceiver, UMTS/HSPA transceiver, or other transceiver. Any number of different cellular communications standards may be used. This may include Long Term Evolution (LTE), LTE Advanced, IMT Advanced, WCDMA (UMTS), HSPA, HSPA+, or other type of cellular technology such as WiMax or any cellular IoT network.

The earpiece may include a 4G LTE subscriber identity module (SIM) card or other SIM card or other identity module. An identity module connector associated with a slot 24A, 24B may be present in the earpiece to allow for access to replace the SIM card or other identity module. Where two earpieces are present, one or both may include a cellular transceiver. Where both earpieces include a cellular transceiver, it is contemplated that only one need to be used and the system may determine which cellular transceiver to use based on available battery life or other factors. In an alternative embodiment, the cellular transceiver is disposed within a charging case 18 associated with one or more earpieces an in operative communication with one or both earpieces such as through a Bluetooth, Wi-Fi, or other wireless connection.

Figure 3:
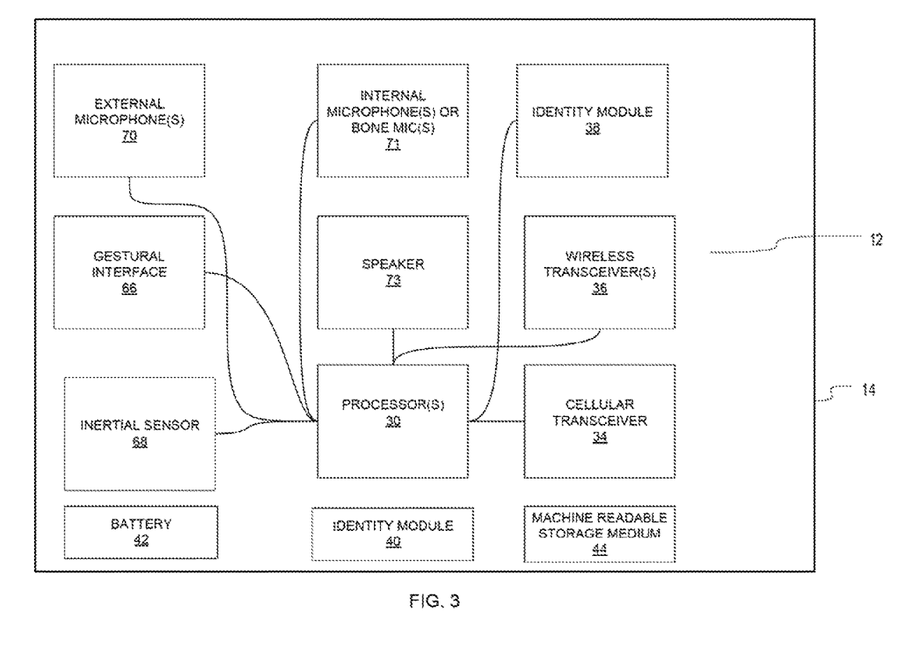
FIG. 3 is a block diagram of one example of an earpiece.

FIG. 3 illustrates one example of a block diagram for an earpiece 12. The earpiece 12 has an earpiece housing 14. There is at least one processor 30 disposed within the earpiece housing 14. The processor 30 is operatively connected to a cellular transceiver 34. The processor 30 may also be operatively connected to one or more wireless transceivers 36. The one or more short range wireless transceivers 36 may include one or more radio transceivers such as a Bluetooth transceiver, a Wi-Fi transceiver or other types of radio transceiver. The one or more wireless transceivers may also include one or more near field magnetic interference (NFMI) or other types of transceivers. A speaker 73 or other type of transducer is also operatively connected to the processor 30. One or more external microphones 70 may also be operatively connected to the processor 30 as well as one or more internal microphones 71 which may include one or more bone microphones for picking up bone sound vibrations associated with a user of the earpiece speaking. A gestural interface 66 may also be operatively connected to the processor 30. The gestural interface 66 allows a user to make gestures which affect an energy field in a manner which is detectable. The gestural interface may use an infrared light field, a capacitive field or other type of energy field. Example of gestures may include a tap, a double tap, a triple tap, a left to right swipe, a right to left swipe, a top to bottom swipe, a bottom to top swipe. Alternatively, instead of a gestural interface 66, one or more manual inputs such as buttons may be provided. It is also to be understood that the processor(s) 30 may provide for voice recognition and/or voice control of the earpiece 12. An inertial sensor 68 is also operatively connected to the processor(s) 30. The inertial sensor 68 may be used to detect various movements of a user or their head. Movements such as nodding a head, to indicate "yes" or shaking a head to indicate "no" may be used to provide user feedback to the earpiece 14. It is to be understood that such movements may be presented in response to a voice prompt from the earpiece. For example, the earpiece may prompt, "Call from Grandpa Jim. Accept call?" and then wait to receive feedback from the user in various forms such as through head movement, gestural control, voice feedback or otherwise.

Thus, for example, a user may shake their head in a side-to-side fashion to indicate that they do not wish to accept the phone call. Alternatively, a user may shake their head in an up and down motion to indicate that they do wish to accept the call. Thus, head movement may be used in conjunction with various functions associated with use of a phone. In other words, one or more inertial sensors in one or two earpieces may be used to detect head movement which is used as input to control operations of the phone in operative communication with the ear piece or the cellular transceiver within the ear piece (or the other ear piece within a set of left and right ear pieces). It is to be understood that this functionality may be used regardless of whether one or both ear pieces includes a cellular transceiver or whether an earpiece is in wireless, wired, or otherwise in operative communication with a mobile phone or other device which provides for accepting phone calls, audio calls or audio/video calls. For example, the call may be over a cellular communication network or over other types of network including the Internet. Thus, for example, the call may be a SKYPE call, GOOGLE HANGOUTS, VIBER, WEBEX, UBERCONFERENCE, FACETIME call or conference, or any number of different types of calls or conferences.

In addition phone calls from the device may be made in various ways including through voice dialing by speaking a phone number or identifying a contact to call. In addition, text messages of various types or social media messages may be performed by the device. This may occur through recording a voice message which is then translated to text either at the processor(s) 30 of the device or at a remote server. Alternatively, this may occur through sending a voice message. Similarly, text or audio messages may be read or played by the device. To reduce processing within the device, text may be converted to an audio message at a remote server and communicated to the device for playback as an audio stream.

FIG. 3 further illustrates one example of an identity module 40 which may be a SIM card or other type of identity module. The SIM card may take on any number of different form factors and may be a micro-SIM card or a nano-SIM card, for example. The processor 30 may be operatively connected to the identity module 40. A machine readable storage medium 44 may also be operatively connected to the processor(s) 30. Information stored on the machine readable storage medium may include contact information, incoming audio messages, outgoing audio messages, or any other type of data that supports operation of the earpiece 14.

Where two earpieces are used (e.g. a left ear piece and a right ear piece) and both earpieces include a cellular transceiver, it is contemplated that both earpieces may make phone calls separately and independently with its own phone number. In addition, the processors within the earpieces may communicate with each other, such as through a short range transceiver to alter various settings and the like. For example, based on remaining battery life, functions of one earpiece may be transitioned to the other earpiece. Thus, for example, where the battery life of one earpiece is low, phone calls to that earpiece may be forwarded to the other earpiece and the other earpiece may be used for making and receiving phone calls.

Figure 2:
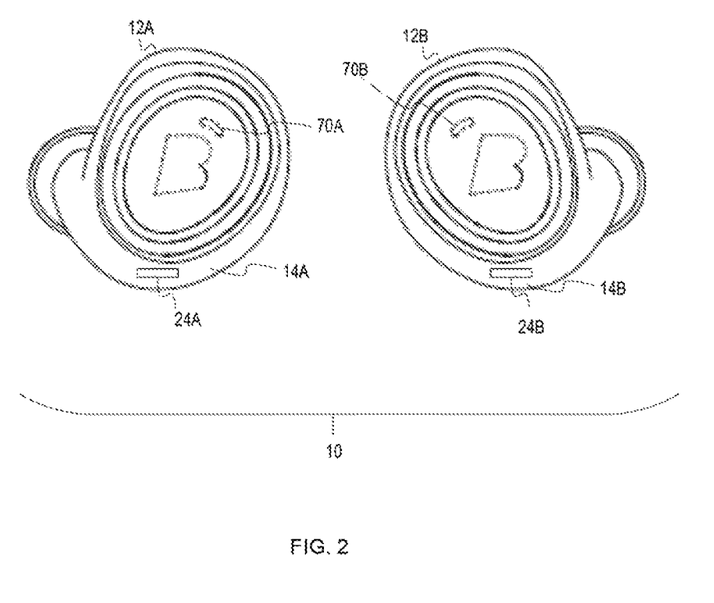
FIG. 2 illustrates a set of earpieces.

As shown in FIG. 1 and FIG. 2, the earpieces 10 may be ear bud type ear pieces, with each housing being an ear bud housing. Alternatively the ear pieces may have other configurations such as a part of a headset or as behind-the-ear (BTE), or other configurations.

Figure 4:
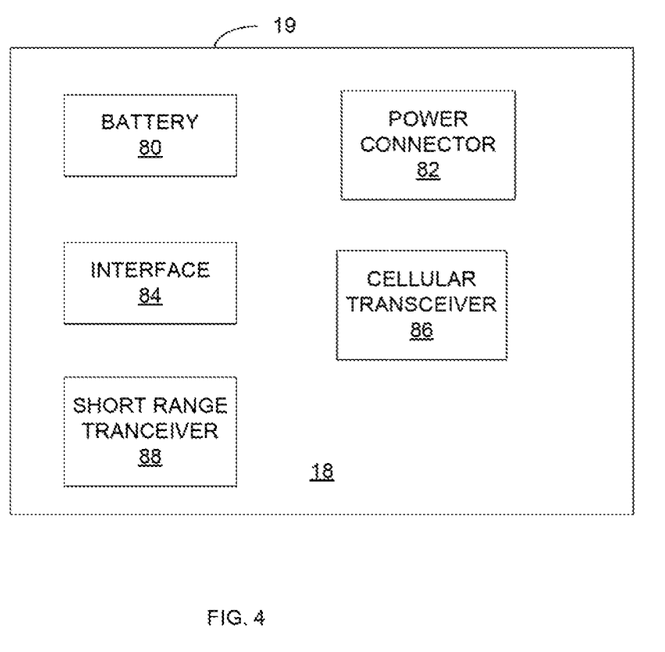
FIG. 4 illustrates a block diagram of a charging case.

FIG. 4 is a block diagram indicating one example of a charging case with cellular connectivity. As shown there is a charging case 18 having a charging case housing 19. The charging case 18 is adapted for receiving a set of ear pieces such as those shown in FIG. 2 or otherwise shown and described herein. There is a short range transceiver 88 such as a Bluetooth, BLE, Wi-Fi, or other type of short range transceiver disposed within the housing 19 of the case 18. The short range transceiver 88 may be used to operatively communicate with one or both of the ear pieces when the earpieces are not within the charging case. When the ear pieces are within the case 18, the ear pieces may connect with the interface 84 so as to recharge batteries on board the earpieces. The interface 84 may provide physical connections between the charger 18 and the ear pieces. Alternatively, the case may recharge the ear pieces using inductive charging. A power connector 82 is shown which may be used to connect the charging case 18 to a power source. In one embodiment the power connector 82 may be a USB connector which allows for transfer of data as well as power to the charging case 18.

Thus, an earpiece which includes a cellular transceiver has been shown and described. Although specific embodiments are shown, the present invention contemplates numerous variations, options, and alternatives.

What is claimed is:

1. An earpiece comprising:
   an ear bud housing;
   a processor disposed within the ear bud housing;
   a speaker operatively connected to the processor;
   at least one microphone operatively connected to the processor;
   a cellular transceiver, for direct cellular communications disposed within the ear bud housing and operatively connected to the processor;
   a short range transceiver disposed within the ear bud housing and operatively connected to the processor; and
   an inertial sensor disposed within the ear bud housing and operatively connected to the processor;
   wherein the short range transceiver is configured to wirelessly communicate with a second earpiece; and
   wherein the earpiece is configured to receive user input from a user based on head movement of the user detected with the inertial sensor and to take or ignore an incoming call to the cellular transceiver based on the user input.

2. The earpiece of claim 1 wherein the cellular transceiver is a low energy long term evolution (LTE) cellular transceiver.

3. The earpiece of claim 1 wherein the short range transceiver is a Bluetooth transceiver.

4. The earpiece of claim 1 further comprising a slot within the earpiece housing for receiving an identity module.

5. The earpiece of claim 1 further comprising a plurality of contacts stored on a machine readable storage medium operatively connected to the processor.

6. The earpiece of claim 1 wherein the processor is configured to provide for voice control of the earpiece.

7. A system comprising:
   a pair of wireless earpieces comprising a left ear piece and a right ear piece, each of the wireless earpieces comprising an ear piece housing, a processor disposed within the ear piece housing, a speaker operatively connected to the processor, at least one microphone operatively connected to the processor, a cellular transceiver, for direct cellular communications with a cellular network, disposed within the ear piece housing and operatively connected to the processor, a short range transceiver operatively connected to the processor for wirelessly communicating with the other wireless earpiece, and an inertial sensor disposed within the earpiece housing and operatively connected to the processor;
   wherein each of the wireless earpieces is configured to receive user input from a user based on head movement of the user detected with the inertial sensor and to take or ignore an incoming call to the cellular transceiver based on the user input.

8. The system of claim 7 wherein the cellular transceiver is a low energy long term evolution (LTE) cellular transceiver.

9. The system of claim 7 further comprising a slot within each of the earpiece housings to receive an identity module.

10. The system of claim 7 wherein the left ear piece and the right ear piece are configured to determine to use either the cellular transceiver of the left ear piece or the cellular transceiver of the right ear piece based on available battery life in the left earpiece and available battery life in the right earpiece.

11. The system of claim 7 wherein the left ear piece and the right ear piece are configured to provide for sending stereo communications by sensing left channel audio at the left ear piece and sensing right channel audio at the right ear piece and communicating the left channel audio at the left ear piece and the right channel audio at the right ear piece over a cellular communications channel using either the cellular transceiver of the left ear piece or the cellular transceiver of the right ear piece.

12. The system of claim 11 wherein the left ear piece and the right ear piece are configured to provide for reproducing stereo communications by receiving over the cellular communications channel a stereo communication comprising a left channel and a right channel and transducing audio associated with the left channel at the left ear piece and transducing audio associated with the right channel at the right ear piece.

13. The system of claim 7 wherein the ear piece housing of each of the earpieces is an ear bud housing.

14. A system comprising:
   a pair of wireless earpieces comprising a left ear piece and a right ear piece, each of the wireless earpieces comprising an ear piece housing, a processor disposed within the ear piece housing, a speaker operatively connected to the processor, at least one microphone operatively connected to the processor, a first cellular transceiver, for direct cellular communications over a cellular network, disposed within the ear piece housing and operatively connected to the processor, a first short range transceiver operatively connected to the processor and configured to wirelessly communicate with the other wireless earpiece, and an inertial sensor disposed within the earpiece housing and operatively connected to the processor, wherein each of the wireless earpieces is configured to receive user input from a user based on movement of a user's head detected with the inertial sensor and to take or ignore an incoming call to the first cellular transceiver based on the user's head movement; and a charging case comprising a case housing, a second short range transceiver disposed therein and a second cellular transceiver disposed therein;

wherein each first short range transceiver of the pair of wireless earpieces is configured to communicate with the second short range transceiver of the charging case.

15. The system of claim 14 wherein the ear piece housing of each of the ear pieces is an ear bud housing.

16. The system of claim 14 wherein the charging case is configured to recharge the pair of wireless earpieces inductively.

* * * * *